（12）United States Patent
Krishnamoorthi et al.

(10) Patent No.: US 10,397,940 B2
(45) Date of Patent: Aug. 27, 2019

(54) TECHNIQUES FOR DYNAMICALLY ALLOCATING UPLINK RESOURCES IN WIRELESS COMMUNICATIONS

(71) Applicant: QUALCOMM Incorporated, San Diego, CA (US)

(72) Inventors: Deepak Krishnamoorthi, San Diego, CA (US); Wanshi Chen, San Diego, CA (US); Jong Hyeon Park, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 49 days.

(21) Appl. No.: 15/624,374

(22) Filed: Jun. 15, 2017

(65) Prior Publication Data

US 2018/0035451 A1     Feb. 1, 2018

Related U.S. Application Data

(60) Provisional application No. 62/368,801, filed on Jul. 29, 2016.

(51) Int. Cl.
*H04W 72/12* (2009.01)
*H04W 72/14* (2009.01)
*H04L 5/00* (2006.01)

(52) U.S. Cl.
CPC ......... *H04W 72/1268* (2013.01); *H04L 5/005* (2013.01); *H04L 5/0023* (2013.01);
(Continued)

(58) Field of Classification Search
CPC ...... H04L 5/0055; H04L 5/005; H04L 5/0023
See application file for complete search history.

(56) References Cited

U.S. PATENT DOCUMENTS 9,025,501 B2   5/2015   Li et al.
9,510,365 B2   11/2016  Yang et al.
(Continued)

FOREIGN PATENT DOCUMENTS

WO   WO-2011/102768 A1   8/2011

OTHER PUBLICATIONS

International Search Report and Written Opinion—PCT/US2017/037977—ISA/EPO—Aug. 31, 2017.
(Continued)

*Primary Examiner* — Edan Orgad
*Assistant Examiner* — Emmanuel K Maglo
(74) *Attorney, Agent, or Firm* — Arent Fox, LLP

(57) ABSTRACT

Aspects described herein relate to communicating in a wireless network. Downlink control information having a dynamic resource allocation indicator can be received from a serving access point. It can be determined whether the dynamic resource allocation indicator indicates at least one symbol in a subframe is for uplink data communications or reference signal transmission. Uplink data communications can be transmitted using the at least one symbol based at least in part on the determination that the dynamic resource allocation indicator indicates the at least one symbol in the subframe is for the uplink data communication, though a broadcasted reference signal configuration may indicate otherwise. Numerous other aspects are provided.

28 Claims, 6 Drawing Sheets

(52) U.S. Cl.
CPC .......... *H04L 5/0044* (2013.01); *H04L 5/0094* (2013.01); *H04W 72/12* (2013.01); *H04W 72/14* (2013.01); *H04W 72/1289* (2013.01)

(56) References Cited

U.S. PATENT DOCUMENTS

| | | | | |
|---|---|---|---|---|
| 2009/0274078 A1* | 11/2009 | Zhao | ................ | H04W 72/0413 370/293 |
| 2012/0014349 A1* | 1/2012 | Chung | ................ | H04B 7/0684 370/329 |
| 2012/0294254 A1 | 11/2012 | Behravan et al. | | |
| 2013/0182674 A1 | 7/2013 | Lunttila et al. | | |
| 2015/0195063 A1 | 7/2015 | Ro et al. | | |
| 2015/0296533 A1* | 10/2015 | Park | ....................... | H04B 7/208 370/329 |
| 2016/0150529 A1 | 5/2016 | Noh et al. | | |

OTHER PUBLICATIONS

Huawei et al.,"Configuration of Aperiodic SRS", 3GPP Draft, R1-105849, Configuration of Aperiodic SRS, 3rd Generation Partnership Project (3GPP), Mobile Competence Centre, 650, Route Des Lucioles, F-06921 Sophia-Antipolis Cedex, France, vol. RAN WG1, No. Jacksonville, USA; 20101115, Nov. 13, 2010 (Nov. 13, 2010), XP050489868, 5 Pages.

Nokia Siemens Networks et al., "Simultaneous Transmission of PUCCH and SRS", 3GPP Draft, R1-080295, 3rd Generation Partnership Project (3GPP), Mobile Competence Centre, 650, Route Des Lucioles, F-06921 Sophia-Antipolis Cedex, France, vol. RAN WG1, No. Sevilla, Spain, 20080108, Jan. 8, 2008 (Jan. 8, 2008), XP050108816, 8 Pages.

Second Written Opinion issued in International Application No. PCT/US2017/037977, dated Jun. 27, 2018, 8 Pages.

* cited by examiner

TECHNIQUES FOR DYNAMICALLY ALLOCATING UPLINK RESOURCES IN WIRELESS COMMUNICATIONS

CLAIM OF PRIORITY UNDER 35 U.S.C. § 119

The present application for patent claims priority to Provisional Application No. 62/368,801, entitled "TECHNIQUES FOR DYNAMICALLY ALLOCATING UPLINK RESOURCES IN WIRELESS COMMUNICATIONS" filed Jul. 29, 2016, which is assigned to the assignee hereof and hereby expressly incorporated by reference herein for all purposes.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple user equipment devices. Each user equipment (UE) communicates with one or more base stations, such as an evolved Node B (eNB) via transmissions on the forward and reverse links. The forward link (or downlink) refers to the communication link from the eNBs to the UEs, and the reverse link (or uplink) refers to the communication link from the UEs to the eNBs. This communication link may be established via a single-in-single-out, multiple-in-single-out or a multiple-in-multiple-out (MIMO) system. In this regard, the UEs can access wireless network via one or more eNBs.

In LTE, an eNB can configure cell sounding reference signal (SRS) transmission opportunities in all subframes by blanking a last symbol of a physical uplink shared channel (PUSCH) so uplink transmissions from UEs do not collide with SRS transmissions. The configuration of SRS transmission opportunities is static and applies in a given cell regardless of how many UEs are actually communicating in the cell and transmitting SRS.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communications is provided. The method includes receiving, at a user equipment (UE) from a serving access point, a reference signal configuration related to transmitting reference signals over at least one symbol in a subframe, receiving, at the UE from the serving access point, downlink control information having a dynamic resource allocation indicator, determining the dynamic resource allocation indicator indicates the at least one symbol in the subframe is for uplink data communications, and transmitting, by the UE to the serving access point and based at least in part on the determination that the dynamic resource allocation indicator indicates the at least one symbol in the subframe is for the uplink data communications, the uplink data communications over the at least one symbol in the subframe.

In another example, an apparatus for wireless communications is provided that includes a transceiver for communicating one or more wireless signals via one or more antennas, a memory configured to store instructions, and one or more processors communicatively coupled with the transceiver and the memory. The one or more processors are configured to receive, from a serving access point, a reference signal configuration related to transmitting reference signals over at least one symbol in a subframe, receive, from the serving access point, downlink control information having a dynamic resource allocation indicator, determine the dynamic resource allocation indicator indicates the at least one symbol in the subframe is for uplink data communications, and transmit, to the serving access point and based at least in part on the determination that the dynamic resource allocation indicator indicates the at least one symbol in the subframe is for the uplink data communications, the uplink data communications over the at least one symbol in the subframe.

In another aspect, a method for wireless communications is provided. The method includes transmitting, by an access point and to one or more devices, a reference signal configuration related to transmitting reference signals over at least one symbol in a subframe, transmitting, by the access point and to at least one of the one or more devices, downlink control information over a control channel, wherein the downlink control information includes a dynamic resource allocation indicator indicating the at least one symbol in the subframe is for uplink data communications, generating, by the access point, an uplink resource grant indicating resources for the uplink data communications in the at least one symbol based on the dynamic resource allocation indicator indicating the at least one symbol is for the uplink data communications, and transmitting, by the access point, the uplink resource grant to the one or more devices.

In another example, an apparatus for wireless communications is provided that includes a transceiver for communicating one or more wireless signals via one or more antennas, a memory configured to store instructions, and one or more processors communicatively coupled with the transceiver and the memory. The one or more processors are configured to transmit, to one or more devices, a reference signal configuration related to transmitting reference signals over at least one symbol in a subframe, transmit, to at least one of the one or more devices, downlink control information over a control channel, wherein the downlink control information includes a dynamic resource allocation indicator indicating the at least one symbol in the subframe is for uplink data communications, generate an uplink resource grant indicating resources for the uplink data communications in the at least one symbol based on the dynamic resource allocation indicator indicating the at least one symbol is for the uplink data communications, and transmit the uplink resource grant to the one or more devices.

In another example, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
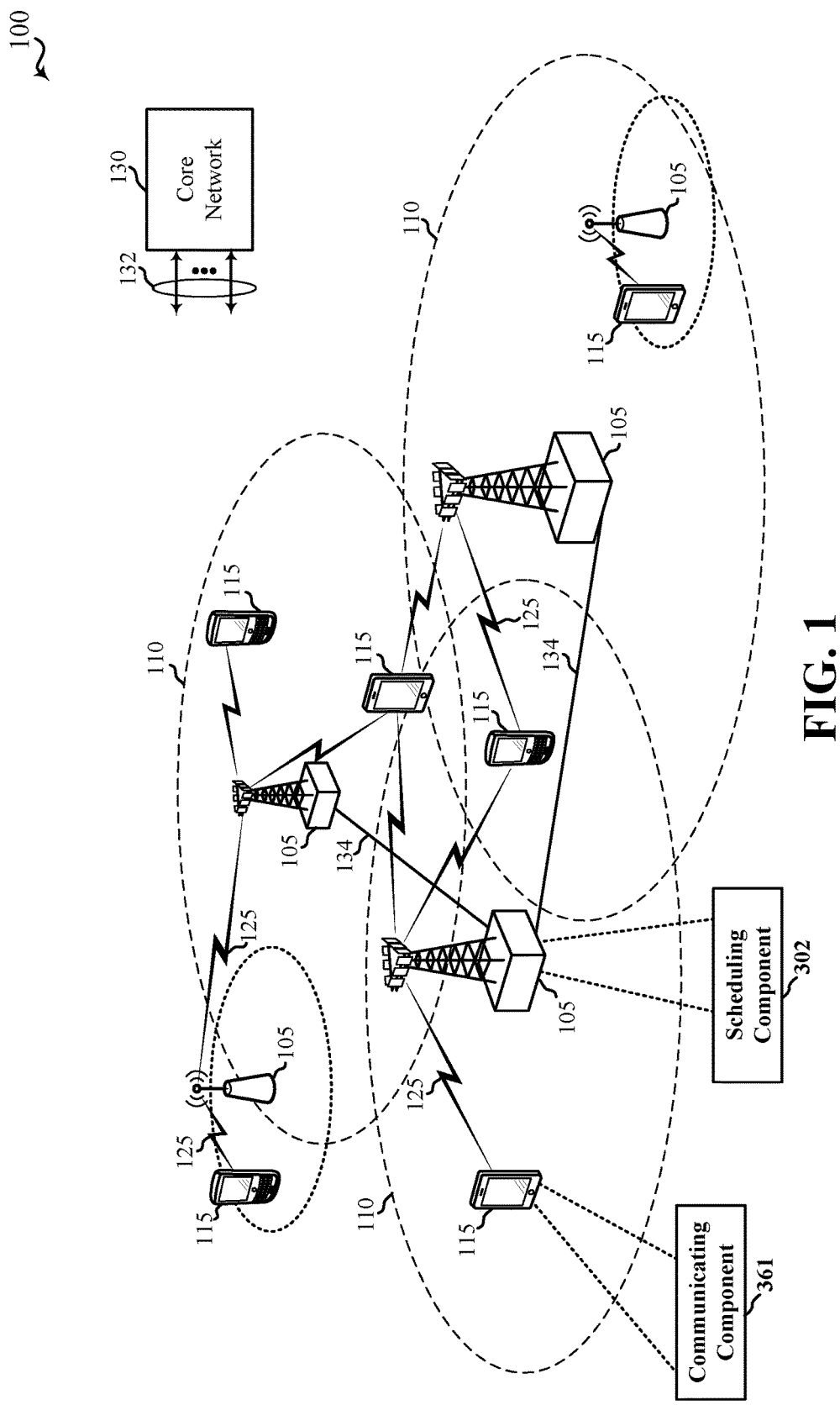
FIG. 1 shows a block diagram conceptually illustrating an example of a telecommunications system, in accordance with aspects described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to dynamically indicating whether a portion of a communication frame in wireless communications is to be used for transmitting uplink data communications or reference signals. For example, a base station can schedule a user equipment (UE) for communicating with the base station, and can indicate whether at least one symbol (e.g., a last symbol) in a subframe is to be used for uplink shared data channel communications or reference signal transmissions. The UE can receive the indication from the base station and can transmit uplink data communications where it is determined that the at least one symbol is to be used for uplink shared data channel communications. In an example, the base station can indicate whether the at least one symbol is to be used for uplink data communications or reference signal transmissions for each subframe, and/or can additionally schedule one or more UEs to transmit in the uplink shared data channel based at least in part on indicating that the at least one symbol is to be used for uplink data communications. In an example, the base station may initially transmit a (e.g., static) cell-specific reference signal configuration indicating that the at least one symbol is to be used for reference signal transmission. In this example, the base station may then control whether the at least one symbol is to be used for the reference signal transmission or uplink shared data channel communications using an indicator (e.g., an override indicator) in an uplink grant or other more dynamic configuration.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, user equipment, or user equipment device. A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, access node, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN (WLAN), BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. One or more of the access points 105 can include a scheduling component 302 for scheduling communications for one or more UEs 115, which may include indicating whether at least a portion of a communication frame is used for uplink data communications or reference signal transmissions. One or more of UEs 115 can include a communicating component 361 for communicating with the one or more access points 105 based at least in part on scheduling from the one or more access points 105.

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each of the communication links 125 may be a multi-carrier signal modulated according to the various radio technologies described above. Each modulated signal may be sent on a different carrier and may carry control information (e.g., reference signals, control channels, etc.), overhead information, data, etc.

In this regard, a UE 115 can be configured to communicate with one or more access points 105 over multiple carriers using carrier aggregation (CA) (e.g., with one access point 105) and/or multiple connectivity (e.g., with multiple access points 105). In either case, the UE 115 can be configured with at least one primary cell (PCell) configured to support uplink and downlink communications between the UE 115 and an access point 105. In an example, there can be a PCell for each of the communication links 125 between a UE 115 and a given access point 105. In addition, each of the communication links 125 can have one or more secondary cells (SCell) that can support uplink and/or downlink communications as well. In some examples, the PCell can be used to communicate at least a control channel, and the SCell can be used to communicate a data channel.

The access points 105 may wirelessly communicate with the UEs 115 via one or more access point antennas. Each of the access points 105 sites may provide communication coverage for a respective coverage area 110. In some examples, the access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example. In addition or alternatively to unrestricted access, a small cell may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells. The term eNB, as used generally herein, may relate to a macro eNB and/or a small cell eNB.

In an example, a small cell may operate in an "unlicensed" frequency band or spectrum, which can refer to a portion of radio frequency (RF) space that is not licensed for use by one or more wireless wide area network (WWAN) technologies, but may or may not be used by other communication technologies (e.g., wireless local area network (WLAN) technologies, such as Wi-Fi). Moreover, a network or device that provides, adapts, or extends its operations for use in an "unlicensed" frequency band or spectrum may refer to a network or device that is configured to operate in a contention-based radio frequency band or spectrum. In addition, for illustration purposes, the description below may refer in some respects to an LTE system operating on an unlicensed band by way of example when appropriate, although such descriptions are not necessarily intended to exclude other cellular communication technologies. LTE on an unlicensed band may also be referred to herein as LTE/LTE-Advanced in unlicensed spectrum, or simply LTE, in the surrounding context.

The core network 130 may communicate with the eNBs or other access points 105 via a backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity (e.g., CA with each of one or more access points 105) or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for the UEs 115 as well as increasing network and spectrum utilization.

As mentioned, in some examples the access points 105 and UEs 115 may utilize carrier aggregation to transmit on multiple carriers. In some examples, the access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer.

In an example, a UE 115 may communicate with a serving access point 105 via communicating component 361 to receive wireless network access. Access point 105 may schedule the UE 115 with resources for communicating with (e.g., receiving communications from and/or transmitting communications to) access point 105. For example, the access point 105 may indicate whether at least a portion of a communication frame (e.g., at least one symbol in a subframe, such as a last symbol as in LTE) is to be used for uplink data communications or reference signal (e.g., sounding reference signal (SRS)) transmissions. The access point 105 can utilize a dynamic resource allocation indicator for this purpose, and the UE 115 receiving the dynamic resource allocation indicator can determine whether to transmit uplink data communications in the portion of the communication frame based at least in part on the dynamic resource allocation indicator. In an example, the UE 115 may determine whether to transmit uplink data communications in the portion of the communication frame based on a static configuration from the access point 105 (e.g., where the dynamic resource allocation indicator may be an override to the static configuration). This allows the access point 105 to improve resource utilization for uplink transmissions when one or more UEs accessing access point 105 do not transmit SRS to the access point 105 in a given subframe.

Figure 2:
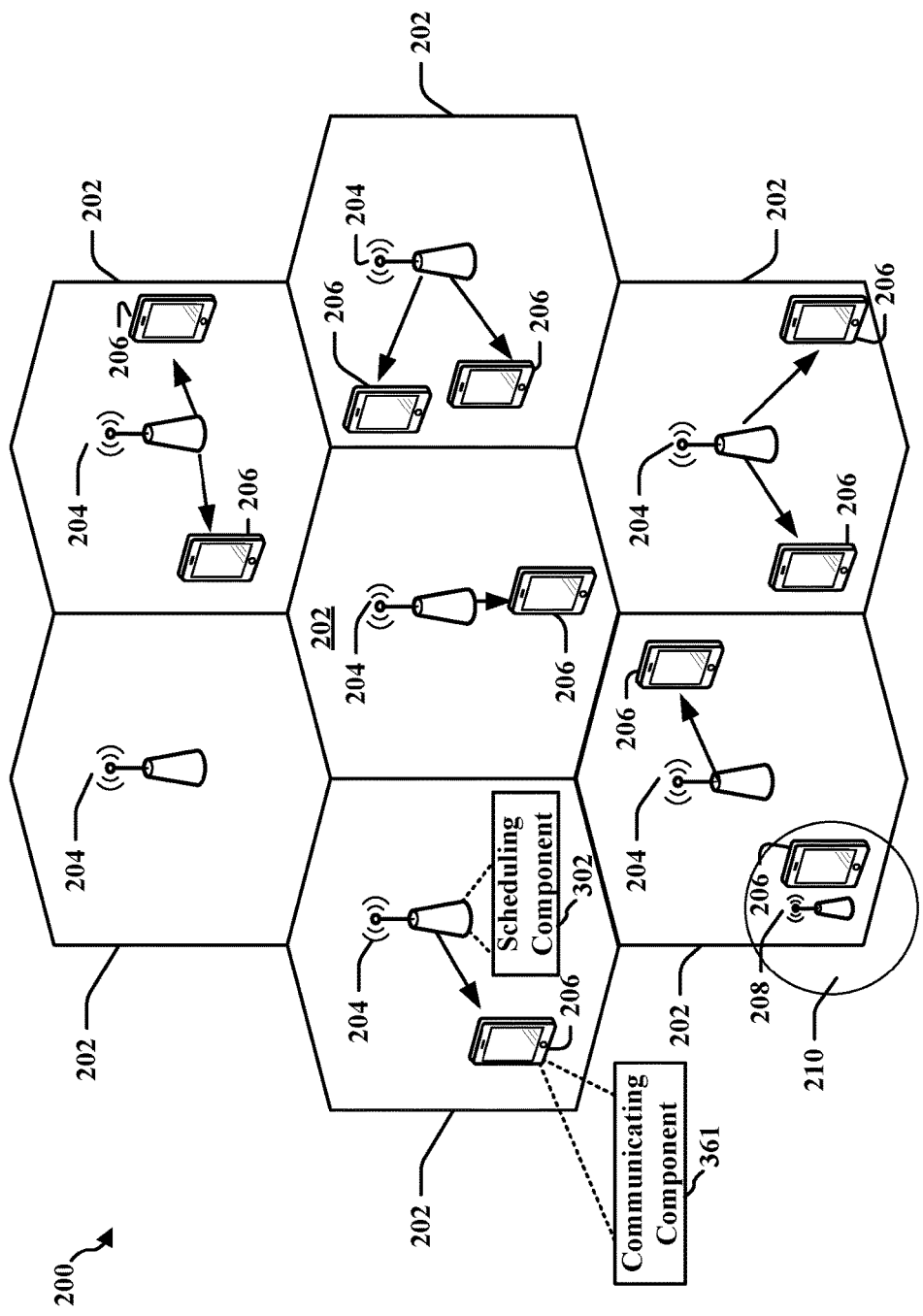
FIG. 2 is a diagram illustrating an example of an access network, in accordance with aspects described herein.

FIG. 2 is a diagram illustrating an example of an access network 200 in an LTE network architecture. In this example, the access network 200 is divided into a number of cellular regions (cells) 202. One or more small cell eNBs 208 may have cellular regions 210 that overlap with one or more of the cells 202. The small cell eNBs 208 may be of a lower power class (e.g., home eNB (HeNB)), femto cell pico cell, micro cell, or remote radio head (RRH), etc.). The macro eNBs 204 are each assigned to a respective cell 202 and are configured to provide an access point to the core network 130 for all the UEs 206 in the cell 202. In an aspect, one or more of eNBs 204, small cell eNBs 208, etc. can include a scheduling component 302 for scheduling communications for one or more UEs 206, which may include indicating whether at least a portion of a communication frame is used for uplink data communications or reference signal transmissions. One or more of UEs 206 can include a communicating component 361 for communicating with the one or more eNBs 204, small cell eNBs 208, etc. based at least in part on scheduling from the one or more one or more eNBs 204, small cell eNBs 208, etc. There is no centralized controller shown in this example of an access network 200, but a centralized controller may be used in alternative configurations. The eNBs 204 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
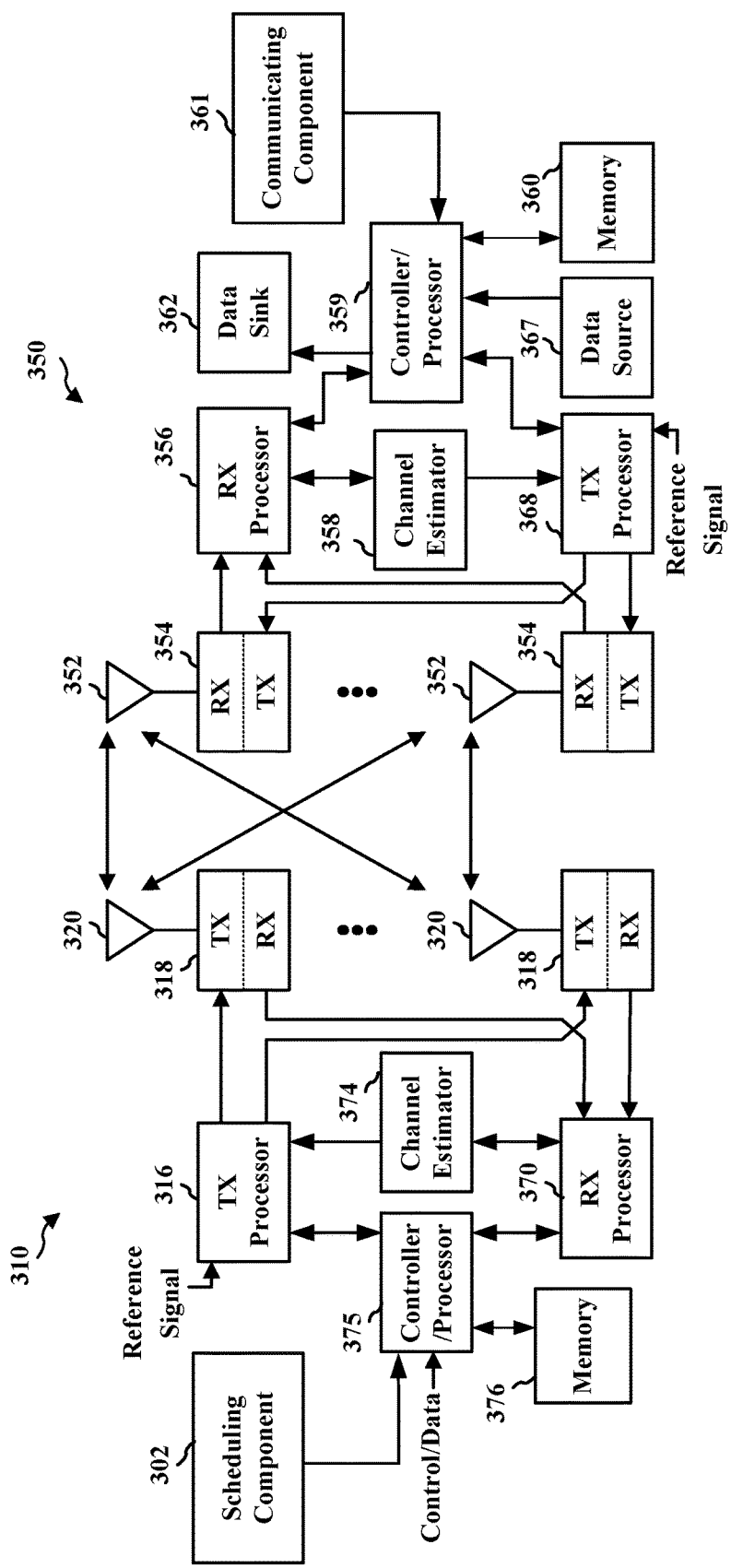
FIG. 3 is a diagram illustrating an example of an access point or evolved Node B and user equipment in an access network, in accordance with aspects described herein.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for hybrid automatic repeat/request (HARD) operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. The eNB 310 can include a scheduling component 302 for scheduling communications for the UE 350, which may include indicating whether at least a portion of a communication frame is used for uplink data communications or reference signal transmissions. Though the scheduling component 302 is shown as coupled to the controller/processor 375, scheduling component 302 can also be coupled to other processors (e.g., TX processor 316, RX processor 370, etc.) and/or implemented by the one or more processors 316, 375, 370 to perform actions described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, the UE 350 may include a communicating component 361 for communicating with the eNB 310 based at least in part on scheduling from the eNB 310. Though the communicating component 361 is shown as coupled to the controller/processor 359, communicating component 361 can also be coupled to other processors (e.g., RX processor 356, TX processor 368, etc.) and/or implemented by the one or more processors 356, 359, 368 to perform actions described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
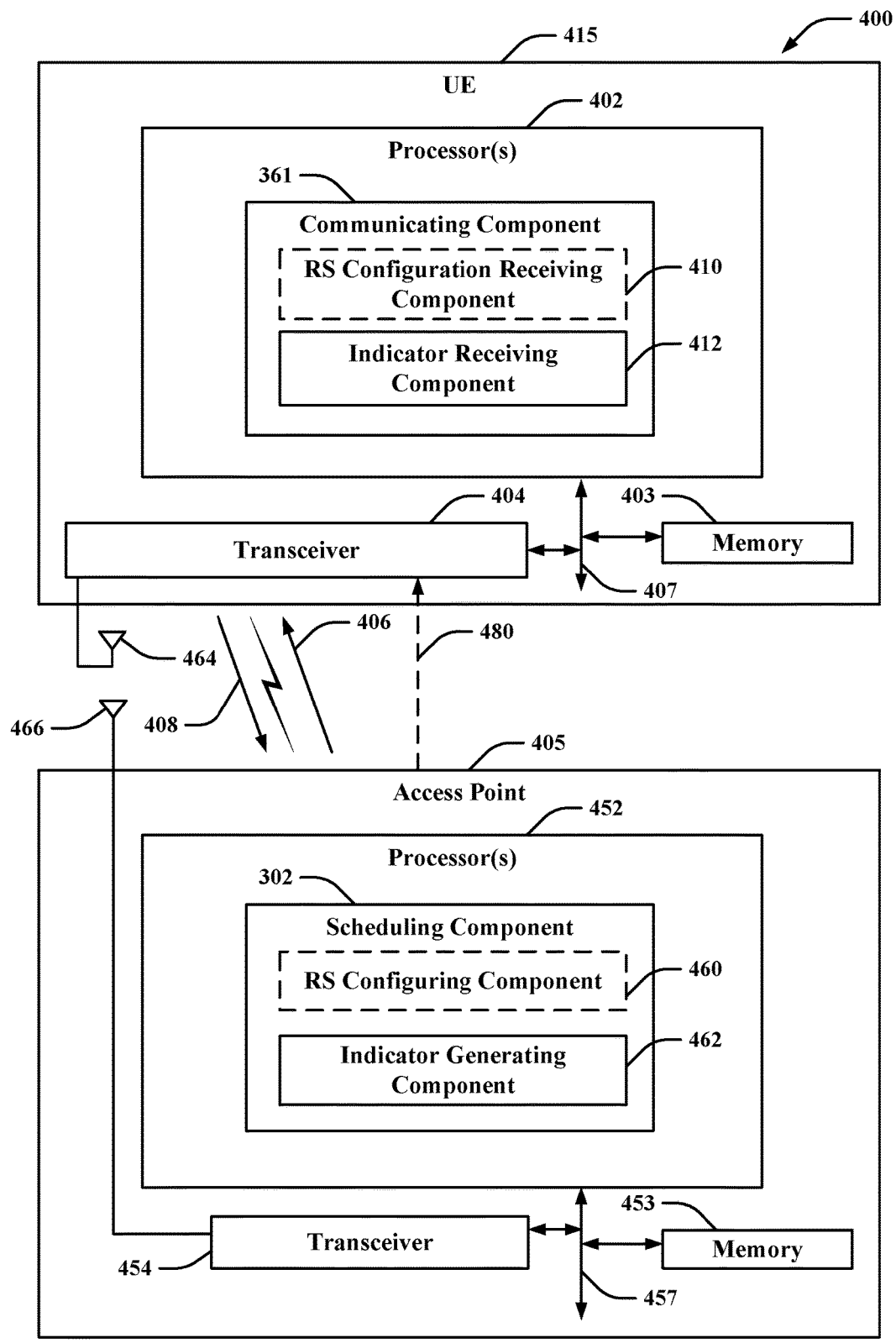
FIG. 4 illustrates an example of a system for determining whether to transmit uplink data communications in one or more portions of a subframe in accordance with aspects described herein.
Figure 5:
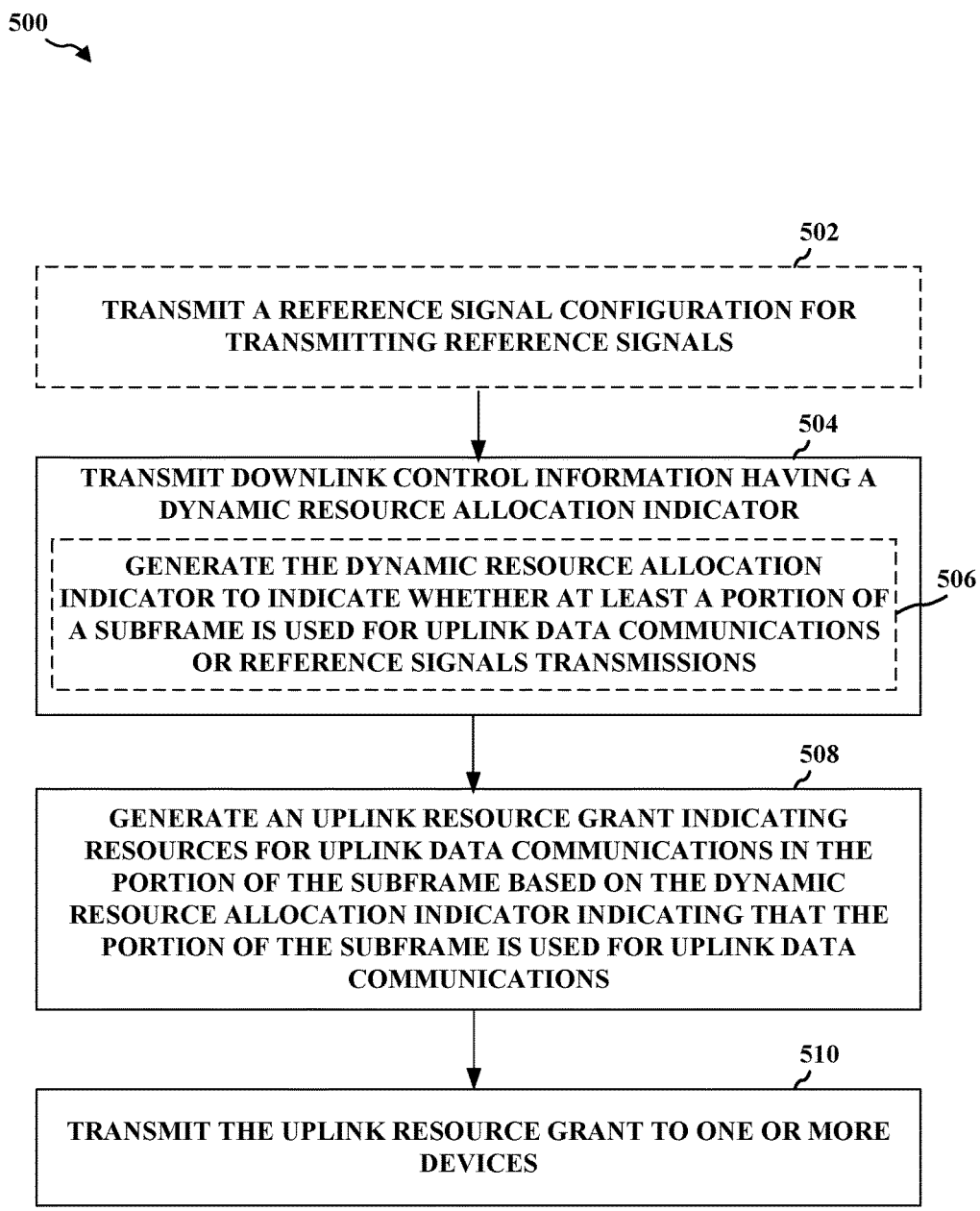
FIG. 5 illustrates an example of a method for indicating whether to transmit uplink data communications in one or more portions of a subframe in accordance with aspects described herein.
Figure 6:
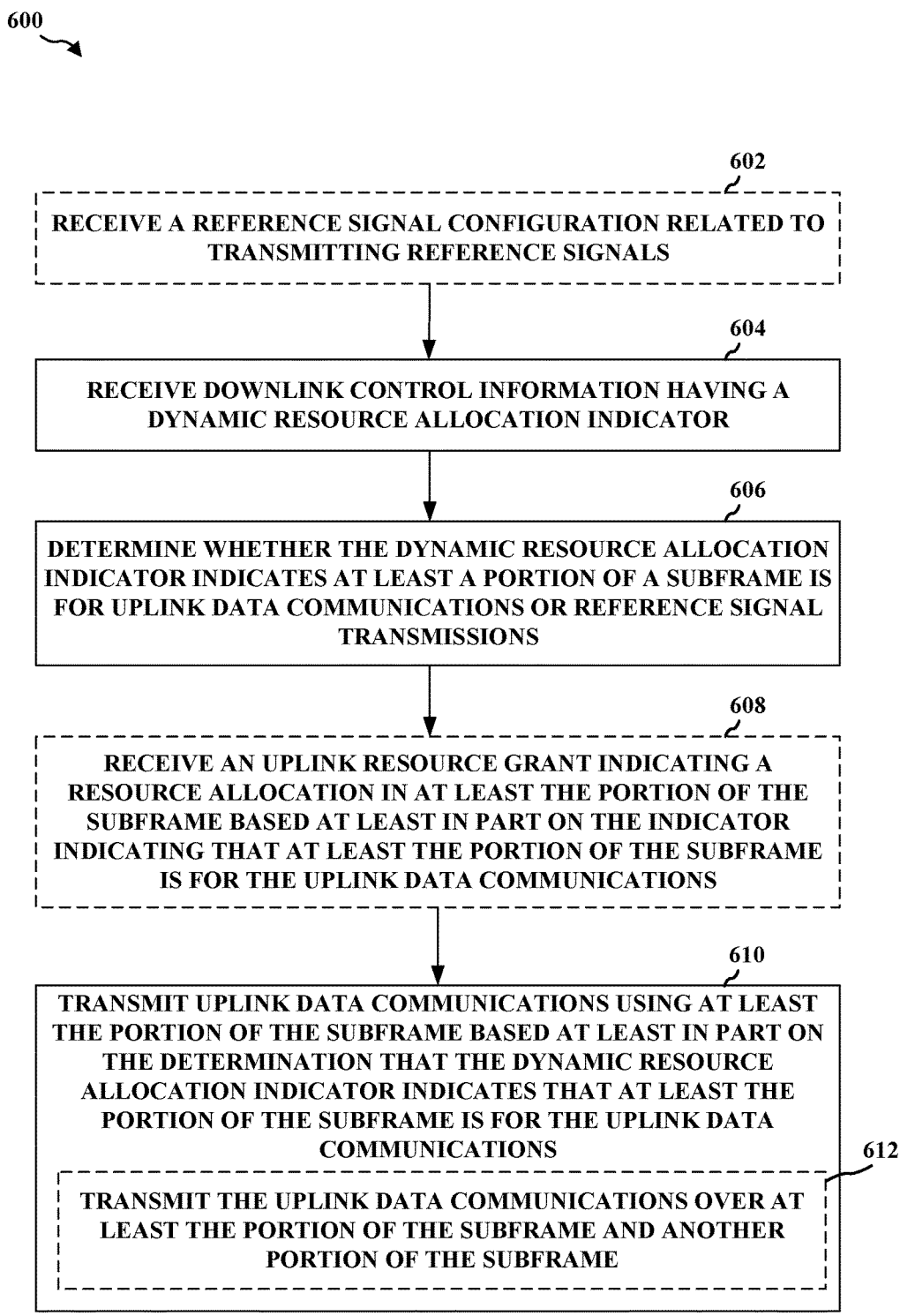
FIG. 6 illustrates an example of a method for determining whether to transmit uplink data communications in one or more portions of a subframe in accordance with aspects described herein.

Turning now to FIGS. 4-6, aspects are depicted with reference to one or more components and one or more methods that may perform the actions or operations described herein, where aspects in dashed line may be optional. Although the operations described below in FIGS. 5-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

FIG. 4 depicts a system 400 for dynamically indicating whether a portion of a communication frame is used for uplink data communications or reference signal transmissions in accordance with aspects described herein. The system 400 includes a UE 415 that communicates with an access point 405 to access a wireless network, examples of which are described in FIGS. 1-3 above (e.g., UEs 115, 206, 350, access points/eNBs 105, 204, 208, 310, etc.). In an aspect, the access point 405 and the UE 415 may have established one or more downlink channels over which downlink signals 406 can be transmitted by the access point 405 (e.g., via access point transceiver 454) and received by the UE 415 (e.g., via UE transceiver 404) for communicating control and/or data messages (e.g., signaling) from the access point 405 to the UE 415 over configured communication resources. Moreover, for example, the access point 405 and the UE 415 may have established one or more uplink channels over which uplink signals 408 can be transmitted by the UE 415 (e.g., via UE transceiver 404) and received by the access point 405 (e.g., via access point transceiver 454) for communicating control and/or data messages (e.g., signaling) from the UE 415 to the access point 405 over configured communication resources. For example, the access point 405 may transmit downlink control information 480 to the UE 415, which is transmitted via an access point transceiver 454 and received via a UE transceiver 404. The downlink control information 480 may include control information related to the UE 415 transmitting signals in a wireless network. For example, the downlink control information 480 may include an indicator (e.g., a static indicator) indicating whether at least a portion of a communication frame is to be used for reference signal transmission, a dynamic resource allocation indicator indicating whether at least a portion of a communication frame is to be used for uplink data communications or reference signal transmissions (e.g., whether to override the static indicator), etc.

In an aspect, UE 415 may include one or more processors 402 and/or memory 403 that may be communicatively coupled, e.g., via one or more buses 407, and may operate in conjunction with or otherwise implement a communicating component 361 for communicating with one or more access points 405 based at least in part on scheduling from the one or more access points 405. For example, the various operations related to the communicating component 361 may be implemented or otherwise executed by one or more processors 402 and, in an aspect, can be executed by a single processor, while in other aspects, different ones of the operations may be executed by a combination of two or more different processors. For example, in an aspect, the one or more processors 402 may include any one or any combination of a modem processor, or a baseband processor, or a digital signal processor, or an application specific integrated circuit (ASIC), or a transmit processor, or a transceiver processor associated with UE transceiver 404. Further, for example, the memory 403 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 402. Moreover, the memory 403 or computer-readable storage medium may be resident in the one or more processors 402, external to the one or more processors 402, distributed across multiple entities including the one or more processors 402, etc.

In particular, the one or more processors 402 and/or memory 403 may execute actions or operations defined by communicating component 361 or its subcomponents. For instance, the one or more processors 402 and/or memory 403 may optionally execute actions or operations defined by a reference signal (RS) configuration receiving component 410 for receiving a RS configuration from an access point 405 for transmitting one or more RSs (e.g., SRS) to the access point 405. In an aspect, for example, the RS configuration receiving component 410 may include hardware (e.g., one or more processor modules of the one or more processors 402) and/or computer-readable code or instructions stored in memory 403 and executable by at least one of the one or more processors 402 to perform the specially configured RS configuration receiving operations described herein. Further, for instance, the one or more processors 402 and/or memory 403 may execute actions or operations defined by an indicator receiving component 412 for receiving a dynamic resource allocation indicator indicating whether a portion of a communication frame or subframe is to be used for uplink data communications or RS transmissions. In an aspect, for example, the indicator receiving component 412 may include hardware (e.g., one or more processor modules of the one or more processors 402) and/or computer-readable code or instructions stored in memory 403 and executable by at least one of the one or more processors 402 to perform the specially configured indicator receiving operations described herein.

Similarly, in an aspect, the access point 405 may include one or more processors 452 and/or memory 453 that may be communicatively coupled, e.g., via one or more buses 457, and may operate in conjunction with or otherwise implement a scheduling component 302 for scheduling communications for one or more UEs 415 (e.g., by transmitting resource grants indicating resources over which the one or more UEs 415 can communicate with the access point 405. For example, the various functions related to the scheduling component 302 may be implemented or otherwise executed by one or more processors 452 and, in an aspect, can be executed by a single processor, while in other aspects, different ones of the functions may be executed by a combination of two or more different processors, as described above. In one example, the one or more processors 452 and/or memory 453 may be configured as described in examples above with respect to the one or more processors 402 and/or memory 403 of UE 415.

In an example, the one or more processors 452 and/or memory 453 may execute actions or operations defined by scheduling component 302 or its subcomponents. For instance, the one or more processors 452 and/or memory 453 may optionally execute actions or operations defined by a RS configuring component 460 for configuring RS transmission (e.g., SRS transmission) by the UE 415 in one or more communication frames or subframes. In an aspect, for example, the RS configuring component 460 may include hardware (e.g., one or more processor modules of the one or more processors 452) and/or computer-readable code or instructions stored in memory 453 and executable by at least one of the one or more processors 452 to perform the specially configured RS configuring operations described herein. Further, for instance, the one or more processors 452 and/or memory 453 may execute actions or operations defined by an indicator generating component 462 for generating a dynamic resource allocation indicator indicating whether a portion of a communication frame or subframe is to be used for uplink data communications or reference signal transmissions. In an aspect, for example, the indicator generating component 462 may include hardware (e.g., one or more processor modules of the one or more processors 452) and/or computer-readable code or instructions stored in memory 453 and executable by at least one of the one or more processors 452 to perform the specially configured indicator generating operations described herein.

In an example, the transceivers 404, 454 may be configured to transmit and receive wireless signals through one or more antennas 464, 466 and may generate or process the signals using one or more RF front end components (e.g., power amplifiers, low noise amplifiers, filters, analog-to-digital converters, digital-to-analog converters, etc.), one or more transmitters, one or more receivers, etc. In an aspect, the transceivers 404, 454 may be tuned to operate at specified frequencies such that the UE 415 and/or the access point 405 can communicate at a certain frequency. In an aspect, the one or more processors 402, 452 may configure the transceivers 404, 454 to operate at a specified frequency and power level based on a configuration, a communication protocol, etc.

In an aspect, the transceivers 404, 454 can operate in multiple bands (e.g., using a multiband-multimode modem, not shown) to process digital data sent and received using the transceivers 404, 454. In an aspect, the transceivers 404, 454 can be multiband and be configured to support multiple frequency bands for a specific communications protocol. In an aspect, the transceivers 404, 454 can be configured to support multiple operating networks and communications protocols. Thus, for example, the transceivers 404, 454 may enable transmission and/or reception of signals based on a specified modem configuration.

FIG. 5 illustrates an example of a method 500 for scheduling (e.g., by an access point) wireless communications for one or more devices (e.g., UEs) and indicating whether at least a portion of a communication frame or subframe is to be used for uplink data communications or RS transmissions. FIG. 6, which is described in conjunction with FIG. 5, illustrates an example of a method 600 for communicating (e.g., by a UE) with an access point (e.g., a base station, a cell thereof, or other access point) based at least in part on receiving an indication of whether at least a portion of a communication frame or subframe is to be used for uplink data communications or RS transmissions. In methods 500 and 600, blocks indicated as dashed boxes represent optional steps.

In an example, method 500 optionally includes, at Block 502, transmitting a RS configuration for transmitting RSs. In an aspect, the RS configuring component 460, e.g., in conjunction with the processor(s) 452, memory 453, and/or access point transceiver 454, can transmit the RS configuration for transmitting RSs. For example, the RS configuring component 460 can broadcast the RS configuration, which may specify a periodicity for transmitting the RSs, resources to use for transmitting the RSs, etc. In one specific example, the RS configuring component 460 can broadcast an SRS configuration in one or more system information blocks (SIB), master information blocks (MIBs), etc., where the SRS configuration can indicate a periodicity for transmitting SRS (e.g., 2 ms, 5 ms, 10 ms, 20 ms, etc.). In an example, where RS configuring component 460 broadcasts the periodicity, the periodicity can apply to substantially all devices (e.g., UEs) communicating in a cell that can transmit SRS, such that the devices can transmit SRS in one or more opportunities according to the periodicity. For example, the SRS configuration may be substantially static in that the parameters for transmitting the RSs may apply until a different SIB is broadcasted from the access point 405 (and/or so long as the SRS configuration is not being overridden, as described further herein).

Method 600, for example, optionally includes, at Block 602, receiving a RS configuration related to transmitting RSs. In an aspect, the RS configuration receiving component 410, e.g., in conjunction with the processor(s) 402, memory 403, and/or UE transceiver 404, can receive the RS configuration related to transmitting RSs. For example, the RS configuration receiving component 410 can receive the RS configuration in broadcast signaling from the access point 405. For example, the RS configuration may specify a periodicity for transmitting the RSs, resources to use for transmitting the RSs, etc. In one specific example, the RS configuration receiving component 410 can receive an SRS configuration in one or more SIBs, MIBs, etc. broadcasted by the access point 405, where the SRS configuration can be a static configuration that indicates a periodicity for transmitting SRS (e.g., 2 ms, 5 ms, 10 ms, 20 ms, etc.). In this example, communicating component 361 can accordingly transmit SRS to the access point 405 according to the indicated periodicity, and/or can also blank transmissions on other SRS transmission opportunities indicated by the SRS configuration.

Moreover, for example, the access point 405 may additionally or alternatively communicate a specific configuration to one or more UEs 415 for transmitting the SRS (e.g., a configuration indicating which of the SRS transmission opportunities indicated in the SRS configuration are assigned to the UE). The specific configuration, for example, may be indicated via at least one of radio resource control (RRC) signaling or other dedicated signaling to the UE 415. In any case, for example, communicating component 361 can transmit the SRS in a portion of a subframe corresponding to the SRS configuration (e.g., periodicity) and/or further specific configuration. In LTE, for example, communicating component 361 can transmit the SRS in a last symbol of the subframe corresponding to the periodicity and/or to the opportunity indicated by the further specific configuration.

In LTE, for example, all UEs can transmit SRSs in the last symbol of a subframe corresponding to a periodicity for transmitting SRSs, and thus the last symbol in each subframe is conventionally blanked for uplink data communications by the UEs, such that the UEs do not transmit uplink data communications over the last symbol, to avoid possible collision with SRS transmissions. For example, UE 415 may determine to blank a last symbol in each subframe based on the SRS configuration received from the access point 405 (e.g., based on receiving the SRS configuration, based on one or more parameters of the SRS configuration indicating that SRSs are to be transmitted, etc.). In this example, UE 415 can accordingly blank the last symbol of all subframes (e.g., not just subframes indicated by the periodicity) to refrain from interfering with potential SRS transmissions by other UEs, except for in subframes during which the UE 415 is configured to transmit SRS. During these subframes, the UE 415 may transmit SRS on the last symbol, as described. In this example, however, it may be that one or more subframes do not have SRS transmissions scheduled, as the UEs are configured to transmit SRSs in certain subframes. Thus, there may be instances where a last symbol in the subframe is not used by any UE communicating with access point 405 to transmit SRS (e.g., according to the periodicity and/or index/offset of SRS configurations), and thus these resources may remain unutilized. The access point 405 may know the subframes based at least in part on the configured periodicity and/or specific configurations for served UEs, based at least in part on predicting subframes for upcoming SRSs based on historical transmission of SRS from the UEs (e.g., and the configured periodicity), and/or the like.

In an example, method 500 can include, at Block 504, transmitting downlink control information (e.g., a formatted downlink control information) having a dynamic resource allocation indicator. In an aspect, the indicator generating component 462, e.g., in conjunction with the processor(s) 452, memory 453, and/or access point transceiver 454, can generate and/or transmit downlink control information 480 having the dynamic resource allocation indicator. In one example, transmitting the downlink control information at Block 504 may optionally include, at Block 506, generating the dynamic resource allocation indicator to indicate whether at least a portion of a subframe is used for uplink data communications or RS transmissions. In an aspect, the indicator generating component 462, e.g., in conjunction with the processor(s) 452, memory 453, and/or access point transceiver 454, can generate the dynamic resource allocation indicator to indicate whether at least a portion of a subframe is used for uplink data communications or RS transmissions.

For example, the indicator generating component 462 can generate the dynamic resource allocation indicator as a bit in a portion of downlink control information 480 transmitted to the UE 415 (e.g., over a downlink control channel) or other dynamic or semi-static signaling. For example, one value of the bit may indicate that the portion of the subframe (e.g., the last symbol of the subframe) is used for uplink data communications while another value of the bit may indicate that the portion of the subframe is used for SRS transmissions. In a specific example, the dynamic resource allocation indicator can include a bit in formatted downlink control information, such as downlink control information (DCI) format, transmitted to the UE 415 in a downlink control channel (e.g., a physical downlink control channel (PDCCH) in LTE). For example, the scheduling component 302 can transmit the formatted DCI or DCI format to the UE 415 for a given subframe (and/or as applicable to one or more subframes of a corresponding resource grant), where the formatted DCI or DCI format may indicate a format of downlink control information along with the dynamic resource allocation indicator. In an example, the dynamic resource allocation indicator may be valid for at least one of a subframe a number of subframes related to a resource grant, a number of subframes (or other units of time) indicated in the dynamic resource allocation indicator, until another dynamic resource allocation indicator is received, etc. In this regard, in an example, the dynamic resource allocation indicator may also indicate to transmit SRS in the at least one symbol (e.g., not to override the SRS configuration).

For example, the access point 405 may know which subframes do not have SRS transmissions from UEs served by the access point 405 based at least in part on knowing the RS configuration(s) and when SRSs are received by the served UEs. In an example, the indicator generating component 462 can determine, for a given subframe, whether any UEs served by the access point 405 are configured to transmit SRS based on the configured SRS periodicity broadcasted by the access point 405. For example, indicator generating component 462 can determine during which subframes SRS transmissions are expected from UEs based on the configured SRS periodicity and/or previous receipt of SRSs from the UEs. When the indicator generating component 462 determines that SRS transmission is not expected from any UEs in a given subframe (or determines that SRS transmission is expected from less than a threshold number of UEs, expected from one or more UEs that are less than a threshold distance from the access point 405 or have a channel quality that achieves a threshold, etc.), indicator generating component 462 can generate the dynamic resource allocation indicator to indicate that the portion (e.g., the last symbol) of the subframe corresponding to the formatted DCI or DCI format is configured for uplink data communications and/or not configured for SRS transmission. In an example, other formats besides a bit can be used for the indicator, such as an integer that indicates a symbol in the subframe used for SRS transmission where one integer value may indicate no symbol is used for SRS transmission, etc. As described, additional information may be included in the indicator as well, such as a number of subframes for which the indicator applies (e.g., a number of subframes over which to override the SRS configuration previously broadcasted by the access point 405).

For example, method 600 can include, at Block 604, receiving downlink control information having a dynamic resource allocation indicator. In an aspect, the indicator receiving component 412, e.g., in conjunction with the processor(s) 402, memory 403, and/or UE transceiver 404, can receive the downlink control information having the dynamic resource allocation indicator. As described, for example, the indicator receiving component 412 can receive the downlink control information as formatted downlink control information, such as DCI format, over a control channel from the access point 405, where the DCI can include the dynamic resource allocation indicator. For example, the dynamic resource allocation indicator may indicate whether to override the reference signal configuration (e.g., SRS configuration) at least for a period of time (e.g., a subframe, a number of subframes, which may correspond to a corresponding uplink grant, until another dynamic resource allocation indicator is received, etc.). The dynamic resource allocation indicator, as described, can include a bit where one value of the bit can indicate that a portion of a subframe corresponding to the DCI (e.g., a last symbol of the subframe) is used for uplink data communications, while another value of the bit can indicate that the portion of the subframe is instead used for SRS transmissions, and/or additional information/parameter values.

In an example, method 600 can also include, at Block 606, determining whether the dynamic resource allocation indicator indicates at least a portion of a subframe is for uplink data communications or RS transmissions. In an aspect, the indicator receiving component 412, e.g., in conjunction with the processor(s) 402, memory 403, and/or UE transceiver 404, can determine whether the dynamic resource allocation indicator indicates at least the portion of the subframe is for uplink data communications or RS transmissions. For example, the indicator receiving component 412 can obtain the dynamic resource allocation indicator from the downlink control information (e.g., from the formatted DCI or DCI format) received from the access point 405, and can accordingly determine whether the portion of the subframe is for uplink data communications or RS transmissions based on the value of the indicator (e.g., the bit value, as described). In an example, other formats can be used for the indicator, such as an integer that indicates a symbol in the subframe used for SRS transmission where one integer value may indicate no symbol is used for SRS transmission, etc. In one example, indicator receiving component 412 can determine to override an SRS configuration, previously received from the access point 405, based on the dynamic resource allocation indicator. For example, as described, access point 405 can broadcast or otherwise transmit a static indication that at least one symbol of a subframe (e.g., the last symbol) is used for SRS transmission. In this example, the dynamic resource allocation indicator may override this SRS configuration such that the at least one symbol that would normally be used for SRS transmission based on the SRS configuration can instead be used for uplink data communications by the UE 415, as described further below.

Method 500, for example, may include, at Block 508, generating an uplink resource grant indicating resources for uplink data communications in the portion of the subframe based on the dynamic resource allocation indicator indicating that the portion of the subframe is used for uplink data communications. In an aspect, the scheduling component 302, e.g., in conjunction with the processor(s) 452, memory 453, and/or access point transceiver 454, can generate the uplink resource grant indicating resources for uplink data communications in the portion of the subframe based on the dynamic resource allocation indicator indicating that the portion of the subframe is used for uplink data communications. For example, the uplink resource grant can include an allocation of resources for the UE 415 within the portion (e.g., the last symbol) of the subframe where the dynamic resource allocation indicator is generated to indicate uplink data communications (and not SRS transmissions) are to be transmitted over the portion of the subframe.

For example, method 500 may also include, at Block 510, transmitting the uplink resource grant to one or more devices. In an aspect, the scheduling component 302, e.g., in conjunction with the processor(s) 452, memory 453, and/or access point transceiver 454, can transmit the uplink resource grant to the one or more devices (e.g., one or more UEs, such as UE 415). For example, scheduling component 302 can transmit the uplink resource grant to the one or more UEs in a downlink control channel (e.g., PDCCH in LTE).

For example, method 600 may optionally include, at Block 608, receiving an uplink resource grant indicating a resource allocation in at least the portion of the subframe based at least in part on the indicator indicating that at least the portion of the subframe is for the uplink data communications. In an aspect, the communicating component 361, e.g., in conjunction with the processor(s) 402, memory 403, and/or UE transceiver 404, can receive the uplink resource grant (e.g., over a downlink control channel, such as PDCCH) indicating the resource allocation in at least the portion of the subframe (e.g., the last symbol of the subframe) based at least in part on the indicator indicating that at least the portion of the subframe is for the uplink data communications. In one example, the uplink resource grant can be included in or with the formatted DCI or DCI format. In any case, for example, the communicating component 361 can determine to transmit uplink data communications in the portion of the subframe, as described herein.

In an example, method 600 may also include, at Block 610, transmitting uplink data communications using at least the portion of the subframe based at least in part on the determination that the dynamic resource allocation indicator indicates that at least the portion of the subframe is for the uplink data communications. In an aspect, the communicating component 361, e.g., in conjunction with the processor(s) 402, memory 403, and/or UE transceiver 404, can transmit uplink data communications using at least the portion of the subframe based at least in part on the determination that the dynamic resource allocation indicator indicates that at least the portion of the subframe is for the uplink data communications. As described, for example, the dynamic resource allocation indicator can indicate to override the previously received SRS configuration at least for a subframe, a number of subframes corresponding to the uplink resource grant, until another dynamic resource allocation indicator is received, etc. For example, communicating component 361 can transmit the uplink data communications in the portion of the subframe (e.g., the last symbol of the subframe) based on the dynamic resource allocation indicator to utilize resources not otherwise used for SRS transmissions and/or based on the uplink resource grant granting resources in the last symbol.

For example, transmitting the uplink data communications at Block 610 may optionally include, at Block 612, transmitting the uplink data communications over at least the portion of the subframe and another portion (e.g., the remainder) of the subframe. In an aspect, the communicating component 361, e.g., in conjunction with the processor(s) 402, memory 403, and/or UE transceiver 404, can transmit the uplink data communications over at least the portion of the subframe and another portion (e.g., the remainder) of the subframe. In one example, communicating component 361 can transmit the uplink data communications over the portion of the subframe based additionally on an uplink resource grant received from the access point 405. In aspects, transmitting the uplink data communications comprises transmitting the uplink data communications over the at least one symbol and remaining symbols in the subframe. In aspects, the method 600 may further include receiving, at the UE from the serving access point, subsequent downlink control information having a subsequent dynamic resource allocation indicator, determining that the subsequent dynamic resource allocation indicator indicates the at least one symbol in a subsequent subframe is for reference signal transmissions, and blanking, or transmitting one or more reference signals over, the at least one symbol in the subsequent subframe based at least in part on the determination that the subsequent dynamic resource allocation indicator indicates the at least one symbol in the subsequent subframe is for reference signal transmissions.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for wireless communications, comprising:
   receiving, at a user equipment (UE) from a serving access point, a reference signal configuration specifying a periodicity related to transmitting reference signals over at least one symbol in a plurality of subframes;
   receiving, at the UE from the serving access point, downlink control information having a dynamic resource allocation indicator;
   determining, at the UE, the dynamic resource allocation indicator indicates to override, for a period of time corresponding to an uplink resource grant, the reference signal configuration in one of the plurality of subframes, wherein determining that the dynamic resource allocation indicator indicates to override the reference signal configuration comprises determining that the dynamic resource allocation indicator indicates the at least one symbol is for the uplink data communications in the one of the plurality of subframes corresponding to the uplink resource grant; and
   transmitting, by the UE to the serving access point and based at least in part on the determination that the dynamic resource allocation indicator indicates to override the reference signal configuration in the one of the plurality of subframes, uplink data communications over the at least one symbol in the one of the plurality of subframes.

2. The method of claim 1, wherein receiving the downlink control information comprises receiving formatted downlink control information (DCI) from the serving access point, wherein the formatted DCI corresponds to the uplink resource grant that indicates uplink resources, and wherein the formatted DCI includes the dynamic resource allocation indicator.

3. The method of claim 2, wherein the dynamic resource allocation indicator is a bit in the formatted DCI.

4. The method of claim 1, wherein transmitting the uplink data communications comprises transmitting the uplink data communications over the at least one symbol and remaining symbols in the one of the plurality of subframes.

5. The method of claim 1, wherein receiving the reference signal configuration comprises receiving the reference signal configuration in one or more system information blocks broadcasted by the serving access point.

6. The method of claim 1, wherein receiving the reference signal configuration further comprises receiving one or more parameters related to the reference signal configuration in at least one of radio resource control signaling or other dedicated signaling from the serving access point.

7. The method of claim 1, wherein the periodicity relates to other UEs transmitting the reference signals and the UE otherwise blanking transmissions in the at least one symbol in the plurality of subframes, and wherein transmitting the uplink data communications is based at least in part on determining to override the reference signal configuration for the one of the plurality of subframes based at least in part on the determination that the dynamic resource allocation indicator indicates that the at least one symbol in the one of the plurality of subframes is for the uplink data communications.

8. The method of claim 1, further comprising determining that the one of the plurality of subframes is not scheduled for transmitting reference signals based on the periodicity.

9. The method of claim 1, further comprising:
   receiving, at the UE from the serving access point, subsequent downlink control information having a subsequent dynamic resource allocation indicator;
   determining that the subsequent dynamic resource allocation indicator indicates the at least one symbol in a subsequent subframe is for reference signal transmissions; and
   blanking, or transmitting one or more reference signals over, the at least one symbol in the subsequent subframe based at least in part on the determination that the subsequent dynamic resource allocation indicator indicates the at least one symbol in the subsequent subframe is for reference signal transmissions.

10. An apparatus for wireless communications, comprising:
    a transceiver for communicating one or more wireless signals via one or more antennas;
    a memory configured to store instructions; and
    one or more processors communicatively coupled with the transceiver and the memory, wherein the one or more processors are configured to:
    receive, from a serving access point, a reference signal configuration specifying a periodicity related to transmitting reference signals over at least one symbol in a plurality of subframes;
    receive, from the serving access point, downlink control information having a dynamic resource allocation indicator;
    determine that the dynamic resource allocation indicator indicates to override, for a period of time corresponding to an uplink resource grant, the reference signal configuration in one of the plurality of subframes, wherein the one or more processors are configured to determine that the dynamic resource allocation indicator indicates the at least one symbol is for the uplink data communications in the one of the plurality of subframes corresponding to the uplink resource grant; and
    transmit, to the serving access point and based at least in part on the determination that the dynamic resource allocation indicator indicates to override the reference signal configuration in the one of the plurality of subframes, uplink data communications over the at least one symbol in the one of the plurality of subframes.

11. The apparatus of claim 10, wherein the one or more processors are configured to receive the downlink control information as formatted downlink control information (DCI), wherein the formatted DCI corresponds to the uplink resource grant that indicates uplink resources, and wherein the formatted DCI includes the dynamic resource allocation indicator.

12. The apparatus of claim 11, wherein the dynamic resource allocation indicator is a bit in the formatted DCI.

13. The apparatus of claim 10, wherein the one or more processors are configured to transmit the uplink data communications over the at least one symbol and remaining symbols in the one of the plurality of subframes.

14. The apparatus of claim 10, wherein the one or more processors are configured to receive the reference signal configuration in one or more system information blocks broadcasted by the serving access point.

15. The apparatus of claim 10, wherein the one or more processors are configured to receive the reference signal configuration based on receiving one or more parameters related to the reference signal configuration in at least one of radio resource control signaling or other dedicated signaling from the serving access point.

16. The apparatus of claim 10, wherein the periodicity relates to other UEs transmitting the reference signals and the apparatus otherwise blanking transmissions in the at least one symbol in the plurality of subframes, and wherein the one or more processors are configured to transmit the uplink data communications based at least in part on determining to override the reference signal configuration for the one of the plurality of subframes based at least in part on the determination that the dynamic resource allocation indicator indicates the at least one symbol in the one of the plurality of subframes is for the uplink data communications.

17. The apparatus of claim 10, wherein the one or more processors are further configured to determine that the one of the plurality of subframes is not scheduled for transmitting reference signals based on the periodicity.

18. The apparatus of claim 10, wherein the one or more processors are further configured to:
   receive, at the UE from the serving access point, subsequent downlink control information having a subsequent dynamic resource allocation indicator;
   determine that the subsequent dynamic resource allocation indicator indicates the at least one symbol in a subsequent subframe is for reference signal transmissions; and
   blank, or transmit one or more reference signals over, the at least one symbol in the subsequent subframe based at least in part on the determination that the subsequent dynamic resource allocation indicator indicates the at least one symbol in the subsequent subframe is for reference signal transmissions.

19. A method for wireless communications, comprising:
   transmitting, by an access point and to one or more devices, a reference signal configuration specifying a periodicity related to transmitting reference signals over at least one symbol in a plurality of subframes;
   transmitting, by the access point and to at least one of the one or more devices, downlink control information over a control channel, wherein the downlink control information includes a dynamic resource allocation indicator indicating to override, for a period of time corresponding to an uplink resource grant, the reference signal configuration in one of the plurality of subframes for uplink data communications, wherein the dynamic resource allocation indicator indicates the at least one symbol is for the uplink data communications in the one of the plurality of subframes corresponding to the uplink resource grant;
   generating, by the access point, the uplink resource grant indicating resources for the uplink data communications in the at least one symbol based on the dynamic resource allocation indicator indicating that the at least one symbol in the one of the plurality of subframes is for the uplink data communications; and
   transmitting, by the access point, the uplink resource grant to the one or more devices.

20. The method of claim 19, wherein transmitting the downlink control information comprises transmitting formatted downlink control information (DCI), wherein the formatted DCI corresponds to the uplink resource grant, and wherein the formatted DCI includes the dynamic resource allocation indicator.

21. The method of claim 20, wherein the dynamic resource allocation indicator is a bit in the formatted DCI.

22. The method of claim 19, wherein transmitting the reference signal configuration comprises broadcasting one or more system information blocks indicating the reference signal configuration.

23. The method of claim 19, wherein transmitting the reference signal configuration comprises transmitting one or more parameters related to the reference signal configuration in at least one of radio resource control signaling or other dedicated signaling to the at least one of the one or more devices.

24. An apparatus for wireless communications, comprising:
   a transceiver for communicating one or more wireless signals via one or more antennas;
   a memory configured to store instructions; and
   one or more processors communicatively coupled with the transceiver and the memory, wherein the one or more processors are configured to:
   transmit, to one or more devices, a reference signal configuration specifying a periodicity related to transmitting reference signals over at least one symbol in a plurality of subframes;
   transmit, to at least one of the one or more devices, downlink control information over a control channel, wherein the downlink control information includes a dynamic resource allocation indicator indicating to override, for a period of time corresponding to an uplink resource grant, the reference signal configuration in one of the plurality of subframes for uplink data communications, wherein the dynamic resource allocation indicator indicates the at least one symbol is for the uplink data communications in the one of the plurality of subframes corresponding to the uplink resource grant;
   generate the uplink resource grant indicating resources for the uplink data communications in the at least one symbol based on the dynamic resource allocation indicator indicating that the at least one symbol in the one of the plurality of subframes is for the uplink data communications; and
   transmit the uplink resource grant to the one or more devices.

25. The apparatus of claim 24, wherein the one or more processors are configured to transmit the downlink control information based on transmitting formatted downlink control information (DCI), wherein the formatted DCI corresponds to the uplink resource grant, and wherein the formatted DCI includes the dynamic resource allocation indicator.

26. The apparatus of claim 25, wherein the dynamic resource allocation indicator is a bit in the formatted DCI.

27. The apparatus of claim 24, wherein the one or more processors are configured to transmit the reference signal configuration based on broadcasting one or more system information blocks indicating the reference signal configuration.

28. The apparatus of claim 24, wherein the one or more processors are configured to transmit the reference signal configuration based on transmitting one or more parameters related to the reference signal configuration in at least one of radio resource control signaling or other dedicated signaling to the at least one of the one or more devices.

\* \* \* \* \*